(12) United States Patent
Burk et al.

(10) Patent No.: US 7,254,947 B2
(45) Date of Patent: Aug. 14, 2007

(54) VEHICLE COOLING SYSTEM

(75) Inventors: Ronnie Franklin Burk, Cedar Falls, IA (US); James Anton Miller, Cedar Falls, IA (US); Alan David Sheidler, Moline, IL (US); Teryl Marvin Oftedal, East Dubuque, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/149,761

(22) Filed: Jun. 10, 2005

(65) Prior Publication Data

US 2006/0277906 A1    Dec. 14, 2006

(51) Int. Cl.
*F02B 29/04*     (2006.01)
*F02B 33/00*     (2006.01)
*F02M 25/07*     (2006.01)
*F01P 9/04*      (2006.01)
*F01P 1/06*      (2006.01)

(52) U.S. Cl. ............... 60/599; 123/563; 123/41.3; 123/41.31; 123/568.12

(58) Field of Classification Search ............ 60/599; 123/563, 41.3, 41.31, 568.12; 180/68.1–68.2; F02M 25/07
See application file for complete search history.

(56) References Cited

U.S. PATENT DOCUMENTS

| | | | | |
|---|---|---|---|---|
| 3,752,132 A | * | 8/1973 | Bentz et al. ............. | 123/563 |
| 4,236,492 A | * | 12/1980 | Tholen .................... | 123/563 |
| 4,317,439 A | * | 3/1982 | Emmerling ............. | 123/563 |
| 5,408,843 A | | 4/1995 | Lukas et al. | |
| 6,244,256 B1 | * | 6/2001 | Wall et al. .............. | 60/605.2 |
| 6,321,697 B1 | * | 11/2001 | Matsuda et al. ......... | 123/563 |
| 6,357,541 B1 | * | 3/2002 | Matsuda et al. ......... | 180/68.2 |
| 6,394,210 B2 | * | 5/2002 | Matsuda et al. ......... | 180/68.1 |
| 6,662,789 B1 | * | 12/2003 | Hatano .................. | 123/568.12 |
| 6,772,715 B2 | * | 8/2004 | Pfeffinger et al. ...... | 123/41.31 |
| 6,789,512 B2 | * | 9/2004 | Duvinage et al. ...... | 123/568.12 |
| 2006/0037590 A1 | * | 2/2006 | Uzkan et al. ............ | 123/563 |
| 2006/0117748 A1 | * | 6/2006 | Bundschuh et al. ..... | 60/599 |
| 2006/0185364 A1 | * | 8/2006 | Chalgren et al. ........ | 60/599 |
| 2006/0185626 A1 | * | 8/2006 | Allen et al. ............. | 123/41.12 |

FOREIGN PATENT DOCUMENTS

| | | | |
|---|---|---|---|
| DE | 10317003 A1 | * | 12/2004 |
| JP | 2002227646 A | * | 8/2002 |
| JP | 2006002660 A | * | 1/2006 |

* cited by examiner

*Primary Examiner*—Thai-Ba Trieu

(57) ABSTRACT

A vehicle engine cooling system includes a primary cooling circuit having a primary radiator and a coolant pump. A secondary cooling circuit includes a secondary radiator, an EGR cooler, and a liquid/air charge air pre-cooler receiving engine inlet air from a turbocharger compressor. The coolant pump circulates coolant through the EGR cooler, through the charge air pre-cooler, and through the primary and secondary radiators. A fan blows cooling air through the primary and secondary radiators. The secondary radiator is downstream of the primary radiator in the fan airflow. The cooling system also includes an air-to-air charge air cooler which receives engine inlet air from the liquid/air charge air pre-cooler. The air-to-air charge air cooler is upstream of the primary radiator with respect to flow of cooling air. The cooling system also includes an auxiliary engine fluid cooler which is located between the air-to-air charge air cooler and the primary radiator.

12 Claims, 1 Drawing Sheet

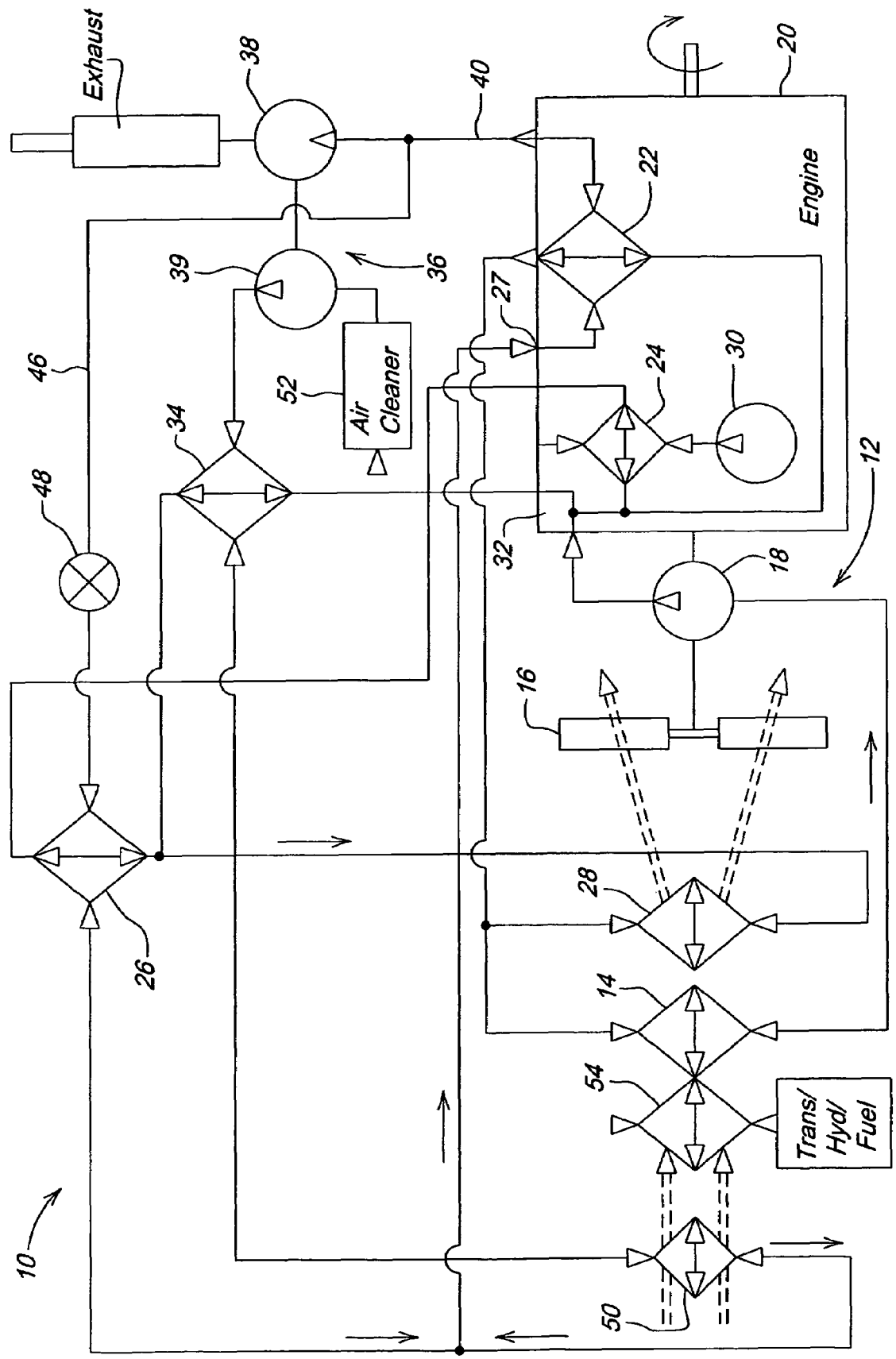

VEHICLE COOLING SYSTEM

BACKGROUND

The present invention relates to a cooling system for a vehicle.

It is known that cooling systems become more effective and more heat is transferred as the temperature difference increases between the fluid being cooled and the coolant. It is also known that cooling systems naturally operate at higher temperatures when handling higher heat loads. But, an engine can be damaged or will operate poorly if the engine receives coolant fluid which becomes too hot.

Some heat sources in a tractor are hotter than the engine block and head cooling circuit. In some cooling systems, such sources are cooled by the coolant used for engine block cooling, thus requiring a larger radiator than would be needed to cool only the engine. But, the amount of additional heat may not justify a separate high temperature cooling circuit.

In the future, Tier III engine emission regulations will require the cooling of yet another high temperature heat source—exhaust gas recirculation or EGR. EGR cooling involves adding some cooled inert exhaust gas to the fresh air supplied to the engine to increase the mass of air in the cylinder. This reduces the maximum temperature in the combustion process, and thereby reduces the amount of NOX produced as a unwanted byproduct.

The need for C-EGR (Cooled—Exhaust Gas recirculation) for tier 3 engine emission requirements has added a high temperature heat source. This, combined with some other current high temperature heat sources, can make a higher temperature circuit practical. Two of the current higher temperature heat sources are the engine oil and the partial cooling of the charge air.

However, if the heat extracted from an EGR cooler were added to the basic engine cooling circuit, the cooling system components would have to be much larger and the power needed by the cooling fan would increase by possibly 50%.

SUMMARY

Accordingly, an object of this invention is to provide a vehicle engine cooling system which includes EGR cooling without increasing the size of the basic engine cooling system components.

These and other objects are achieved by the present invention, wherein a vehicle engine cooling system includes a primary cooling circuit having a primary radiator and a coolant pump for circulating coolant through the engine and the primary radiator. A secondary cooling circuit includes a secondary radiator and one or more coolers for cooling a high temperature heat source, such as exhaust gas recirculation (EGR) cooler, and/or a liquid/air charge air pre-cooler receiving engine inlet air from a turbocharger compressor. The coolant pump circulates coolant through the EGR cooler and/or through the charge air pre-cooler, and through the secondary radiator. A fan blows cooling air through the primary radiator and the secondary radiator. The secondary radiator is preferably downstream of the primary radiator with respect to flow of cooling air. The cooling system may also include an air-to-air charge air cooler which receives engine inlet air from the liquid/air charge air pre-cooler. The air-to-air charge air cooler is preferably upstream of the primary radiator with respect to flow of cooling air. The cooling system also includes an auxiliary engine fluid cooler which is located between the air-to-air charge air cooler and the primary radiator.

BRIEF DESCRIPTION OF THE DRAWINGS

The sole FIGURE is a schematic diagram of a vehicle cooling system according to the invention.

DETAILED DESCRIPTION

Referring to the FIGURE, the cooling system 10 includes an engine cooling circuit 12 which includes a primary or standard radiator 14, a fan 16 and a coolant pump 18, both driven by the engine 20. Radiator 14 receives hot coolant (such as at 98 degrees C.) from the engine 20 and directs cooled coolant (such as at 92 degrees C.) back to an inlet of coolant pump 18. The pump 18 pumps coolant through the engine cooling passages 22 and back to radiator 14.

The pump 18 also pumps coolant through engine oil cooling passages 24 and an EGR cooler 26 and then to an inlet of an additional or secondary high temperature radiator 28 and then back to an inlet of primary radiator 14. The oil cooling passages 24 in the engine 20 receive oil from a conventional engine oil pump 30. The pump 18 also pumps coolant through a passage 32 in the engine 20, through a charge air cooler 34 and then back to the inlet of secondary radiator 28.

A conventional turbo-compressor 36 includes a turbine 38 and a compressor 39. Exhaust gas is communicated from the engine 20 through exhaust line 40 to the turbine 38 of turbo-compressor 36. An EGR line 46 communicates EGR from exhaust line 40 through EGR valve 48 and preferably to EGR cooler 26, then to engine air intake 27. Intake air is received by air cleaner 52, compressed by compressor 39, then preferably cooled by charge air pre-cooler 34, further preferably cooled by an air-to-air charge air cooler 50, then directed to engine air intake 27.

The system may also include an auxiliary oil cooler 54 for cooling fluid such as transmission fluid, hydraulic fluid or fuel. Preferably, coolers 50, 54, 14 and 28 are arranged in series with respect to air blown by fan 16 so that air pulled by fan 16 passes first (at a temperature of approximately 25 degrees C.) through air-to-air charge air cooler 50, then auxiliary cooler 54, then primary radiator 14 and finally high temperature radiator 28, (after which the air is at a temperature of approximately 80 degrees C.).

As a result, in the system 10, the radiator 28 can be considered as an intermediate cooler which receives heat from high temperature heat sources including charge air cooler 34 and EGR cooler 26. The heated coolant from radiator 28 is combined with coolant from the engine 20 and supplied to an inlet of primary radiator 14. Thus, high temperature radiator 28 is downstream of primary radiator with respect to cooling airflow, and radiator 28 pre-cools coolant before the coolant is supplied to the primary radiator 14.

The system 10 can be described as having a lower temperature primary cooling circuit including primary radiator 14, coolant pump 18 and engine coolant passages 22, and as having a higher temperature secondary cooling circuit including secondary radiator 28, coolant pump 18 and coolers 26 and/or 34.

By keeping the coolant temperature higher in the secondary cooling circuit, the cooling can be done with smaller cooling parts and with a reduced amount of air moved by the fan because the high temperature coolant can exchange it's heat into the air already being moved by the fan, thus increasing the final temperature of the cooling air. The cooling air has a typical temperature rise today of 40 degrees C. This secondary cooling circuit can increase this by 15 to 55 degrees C. for a significant increase in heat rejection.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle engine cooling system:
    a primary cooling circuit having a primary radiator, and a coolant pump for circulating coolant through the engine and the primary radiator;
    a secondary cooling circuit having a secondary radiator and an exhaust gas recirculation (EGR) cooler, the coolant pump circulating coolant through the engine, the EGR cooler and the secondary radiator, the primary cooling circuit operating at a temperature which is lower than an operating temperature of the secondary cooling circuit; and
    a fan for blowing cooling air through the primary radiator and the secondary radiator, the secondary radiator being downstream of the primary radiator with respect to flow of cooling air.

2. The cooling system of claim 1, further comprising:
    a liquid/air charge air pre-cooler receiving engine inlet air from a turbocharger compressor, the coolant pump circulating coolant through the charge air pre-cooler and through the secondary radiator.

3. The cooling system of claim 2, further comprising:
    an air-to-air charge air cooler, receiving engine inlet air from the liquid/air charge air pre-cooler, the air-to-air charge air cooler being upstream of the primary radiator with respect to flow of cooling air.

4. The cooling system of claim 3, further comprising:
    an auxiliary engine fluid cooler, the auxiliary cooler being between the air-to-air charge air cooler and the primary radiator with respect to flow of cooling air.

5. The cooling system of claim 1, wherein:
    the secondary radiator has a coolant outlet communicated with a coolant inlet of the primary radiator so that the primary radiator is directly downstream of the secondary radiator with respect to flow of coolant.

6. A vehicle engine cooling system:
    a primary cooling circuit having a primary radiator and a coolant pump for circulating coolant through the engine and the primary radiator;
    a secondary cooling circuit having a secondary radiator and an engine air cooler, the coolant pump circulating coolant through the engine, the engine air cooler and the secondary radiator, the primary cooling circuit operating at a temperature which is lower than an operating temperature of the secondary cooling circuit;
    a liquid/air charge air pre-cooler receiving engine inlet air from a turbocharger compressor, the coolant pump circulating coolant through the charge air pre-cooler and through the secondary radiator; and
    a fan for blowing cooling air through the primary radiator and the secondary radiator, the secondary radiator being downstream of the primary radiator with respect to flow of cooling air.

7. The cooling system of claim 6, wherein:
    the engine air cooler comprises a charge air pre-cooler.

8. The cooling system of claim 6, further comprising:
    an air-to-air charge air cooler, receiving engine inlet air from the liquid/air charge air pre-cooler, the air-to-air charge air cooler being upstream of the primary radiator with respect to flow of cooling air.

9. The cooling system of claim 8, further comprising:
    an auxiliary engine fluid cooler, the auxiliary cooler being between the air-to-air charge air cooler and the primary radiator with respect to flow of cooling air.

10. A vehicle engine cooling system:
    a primary cooling circuit having a primary radiator, a coolant pump for circulating coolant through the engine and the primary radiator;
    a secondary cooling circuit having a secondary radiator and an exhaust gas recirculation (EGR) cooler, the primary cooling circuit operating at a temperature which is lower than an operating temperature of the secondary cooling circuit;
    a liquid/air charge air pre-cooler receiving engine inlet air from a turbocharger compressor, the coolant pump circulating coolant through the EGR cooler, through the charge air pre-cooler and through the secondary radiator; and
    a fan for blowing cooling air through the primary radiator and the secondary radiator, the secondary radiator being downstream of the primary radiator with respect to flow of cooling air.

11. The cooling system of claim 10, further comprising:
    an air-to-air charge air cooler, receiving engine inlet air from the liquid/air charge air pre-cooler, the air-to-air charge air cooler being upstream of the primary radiator with respect to flow of cooling air.

12. The cooling system of claim 10, further comprising:
    an auxiliary engine fluid cooler, the auxiliary cooler being between the air-to-air charge air cooler and the primary radiator with respect to flow of cooling air.

* * * * *